(No Model.) 2 Sheets—Sheet 1.
A. SCHULZE.
DOG OR STOP DEVICE FOR BALING PRESSES.
No. 521,511. Patented June 19, 1894.
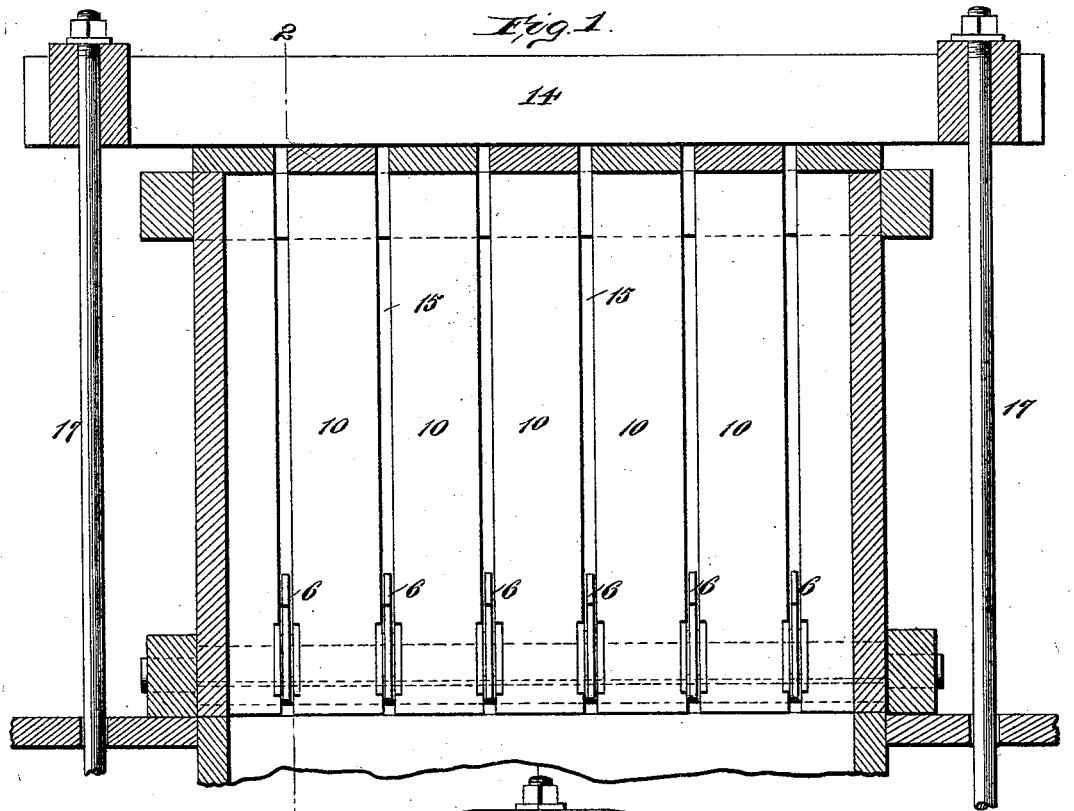
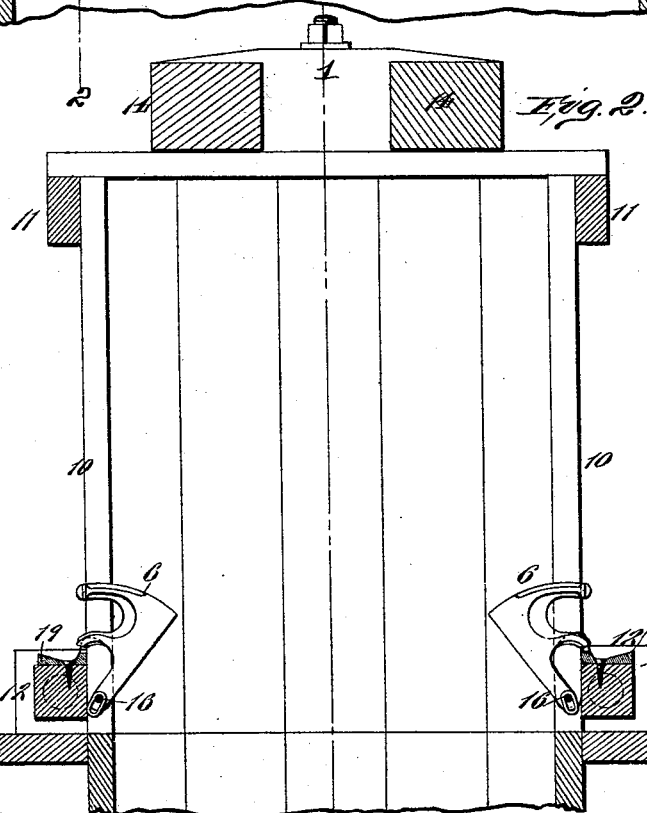
Attest:
Charles Pickles,
Walter D. Coles
Inventor
Andrew Schulze
By Fowler & Fowler
Attys.

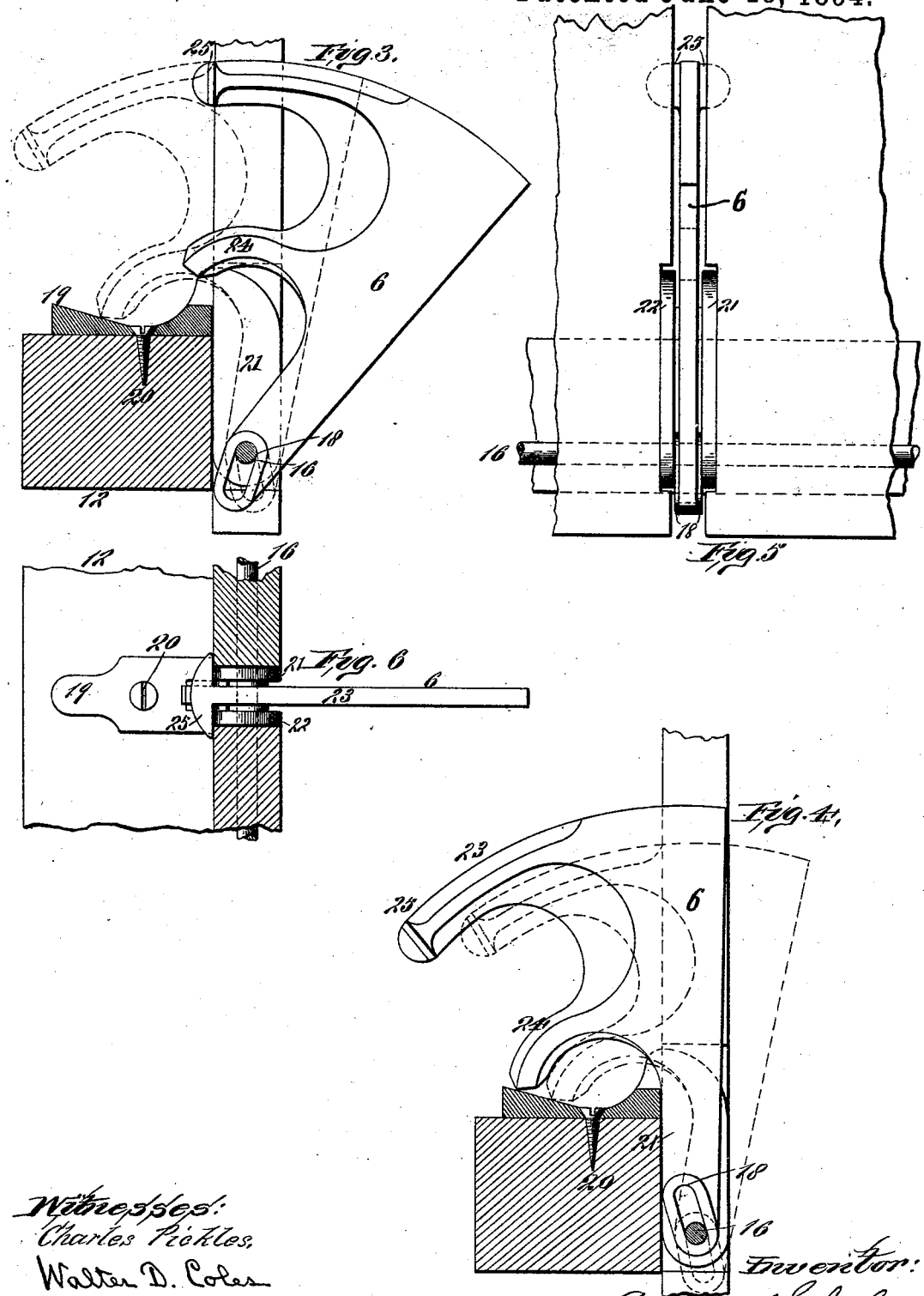

UNITED STATES PATENT OFFICE.

ANDREW SCHULZE, OF LOTT, TEXAS, ASSIGNOR TO THE KINGSLAND & DOUGLAS MANUFACTURING COMPANY, OF ST. LOUIS, MISSOURI.

DOG OR STOP DEVICE FOR BALING-PRESSES.

SPECIFICATION forming part of Letters Patent No. 521,511, dated June 19, 1894.

Application filed April 7, 1893. Serial No. 469,395. (No model.)

*To all whom it may concern:*

Be it known that I, ANDREW SCHULZE, a citizen of the United States, residing at Lott, county of Falls, and State of Texas, have invented a certain new and useful Dog or Stop Device for Baling-Presses, of which the following is such a full, clear, and exact description as will enable any one skilled in the art to which it appertains to make and use the same, reference being had to the accompanying drawings, forming part of this specification.

This invention relates to stop-devices or dogs for use in baling presses, and more especially to such devices for use in baling presses provided with a pressure-chamber in which a plunger or traverser reciprocates.

The object of my invention is to provide a simple, cheap and durable automatically-operating dog or stop for retaining within the pressure chamber of a baling press, the cotton, wool, hay or other material which may be carried into the same by the plunger or traverser during the return stroke of said plunger or traverser. This object I accomplish by providing a dog so pivoted at the side of the pressure-chamber, and so constructed as to be caused by gravity to normally protrude into the same, but adapted to be pushed out of the way by the upward movement of the plunger or traverser, so as to permit the free and unobstructed movement of the same within the pressure-chamber.

Heretofore an automatically-operating dog has been employed in baling presses, the said dog being pivoted at a considerable distance to one side of the pressure-chamber, and being adapted to fall therein by virtue of gravity. Under this construction it has been found that the dog in passing in and out of the pressure-chamber is obliged to move longitudinally or vertically within the pressure-chamber through a considerable space, and it has been found in practice that such longitudinal or vertical motion is opposed by the cotton or other material packed within the press, and the dog is likely to be prevented from falling into the pressure-chamber by the presence of the compressed material therein. It has been attempted to overcome this difficulty by pivoting the dog near the side of the pressure-chamber, but where this is done it has heretofore been found necessary to attach weights or springs to the free end of the dog, in order to cause it to gravitate automatically into the pressure-chamber, the necessity for weights making the stop-device more complicated in construction, and more expensive. In my device these difficulties are obviated. The dog is so pivoted as to move in and out of the pressure-chamber with but little longitudinal or vertical motion, and is also so constructed as to fall automatically into the pressure-chamber without adjunctive weights.

My invention will be best understood by reference to the accompanying drawings, in which—

Figure 1 is a sectional view on a reduced scale, of the pressure-chamber of a baling press provided with my dogs, the section being taken on line 1 of Fig. 2. Fig. 2 is a transverse section of the pressure-chamber of a baling press, taken on the line 2—2 of Fig. 1, being drawn on a reduced scale. Fig. 3 is a side elevation of one of my dogs attached or pivoted to one of the slats of the pressure-chamber of a baling press, the normal position of the same being shown by full lines, and the position when partly pushed out of the way by the traverser being shown by dotted lines. Fig. 4 is a side elevation of one of my dogs pivoted to one of the slats of the pressure-chamber, the position of the same when entirely pushed out of the way being shown by full lines, and the position when partly so pushed out of the way being shown by dotted lines. Fig. 5 is a view of one of my dogs pivoted to the slats of the baling press, looked at from the opposite side of said press. Fig. 6 is a top view of one of my dogs pivoted between the slats of a baling press, the same being shown in its normal position.

Referring to the drawings, in which the same marks of reference indicate the same parts throughout the several views: 10 are the slats inclosing the pressure-chamber of the baling press. The slats are held in place by the upper cross-timbers 11 and the lower cross-timbers 12 (Fig. 2). The pressure-chamber may be braced by any ordinary braces, as the braces 14 secured to the lower part of the press by the rods 17 (Fig. 1). The slats 10 on each side of the pressure-chamber have spaces 15 between them. The dogs 6 are placed in the spaces 15 between the slats, the slats being separated by a sufficient interval to permit the dogs to move freely in and out between them. The dogs are held in place by means of a bolt or rod 16 passing through a slotted boss 18, said slotted boss being situated in the dog near the lower end thereof. The bolt or rod 16 is suitably secured to the adjoining slats. In practice I preferably hold the dogs in place by passing a single rod 16 through all the slats on one side of the press, the said rod passing likewise through the slotted bosses 18 of the several dogs placed between the slats, thus serving to hold the dogs firmly in place, and at the same time strengthening and bracing the pressure-chamber.

The slotted boss 18 has flat outer surfaces on both sides thereof forming bearing surfaces, as hereinafter explained.

The longitudinal slot formed in bearing surface or boss 18 is given such a direction therein that when the dog 6 falls vertically by virtue of gravity through the length of said slot, as hereinafter explained, the dog 6 will thereby be caused to assume an inwardly-inclined position, so that gravity will then cause said dog to rotate about the rod 16 and fall forward into the pressure chamber in the desired position.

To the cross-timbers 12 immediately behind the spaces 15, are secured the iron plates 19, which said plates are held in place in any suitable manner, as, for instance, by the screws 20 passing through the plates and into the cross-timbers 12. The plates 19 have two downward projections 21 and 22 (Fig. 5), said projections extending into the spaces 15 and forming bearing surfaces for the flat outer surfaces of the slotted boss 18. The rod 16 which passes through the slotted boss 18, also preferably passes through suitable orifices in the projections 21 and 22 of the plates 19. The rear portion of the plates 19 which rests upon the cross-timber 12 is preferably made of unequal thickness, it being thinner near its center and thicker at its rear edge, so that its upper surface slopes upward from near its center to its rear edge. The plate 19 serves the purposes of bracing the frame surrounding the pressure-chamber, of forming a bearing surface for the dogs as aforesaid, and it further acts as a surface upon which the dog 6 slides during part of its outward movement, as hereinafter set forth.

The dog 6 is sector-like or triangular in shape, and is so cut away at the back thereof as to have two backwardly-projecting portions or arms, an upper arm 23 and a central arm 24. The upper arm 23 has the laterally-extending lugs 25 on both sides thereof, the purpose of said lugs being to come in contact with the slats 10, and thereby arrest said dog as it falls into the pressure-chamber.

The mode of operation of my dog is as follows: The dog normally occupies the position shown by full lines in Fig. 3, that is to say, when left free, gravity causes it to fall forward into the pressure chamber until arrested by the lugs 25 striking against the slats 10. When the traverser upon its upward stroke strikes against the dog, it will cause said dog to rotate about the rod 16 which passes through the slotted boss 18, and such rotation will continue until the central arm 24 comes in contact with the plate 19. It is obvious that after the arm 24 has come in contact with the plate 19, no further rotation can take place about the rod 16, and said rod ceases to be the fulcrum about which the dog moves. The position of the dog at this point is shown by the dotted lines in Figs. 3 and 4. By reference to those figures it will be seen that the rod 16 rests in the upper end of the slotted boss 18, and the arm 24 is in contact with the plate 19 near the base of the upwardly-inclined rear portion thereof. As the traverser continues its upward movement, the arm 24 slides along the upwardly-inclined rear portion of the plate 19, the position of the slotted boss 18 permitting the dog to move upward and outward, until said dog has been pushed entirely without the pressure-chamber, and assumes the position shown by full lines in Fig. 4. When the traverser has completed its upward stroke and moved backward, support being withdrawn from the dog, gravity will cause it first to fall downward through the length of the slot, and occupy the inwardly-inclined position shown by dotted lines in Figs. 3 and 4, and second, to rotate about the rod 16 until it assumes the normal position shown in Fig. 3. As the dog falls inward as aforesaid, it will serve to support and retain within the pressure-chamber the cotton, hay, &c., which has been carried therein by the upward stroke of the now receding traverser, and the operation hereinbefore described will be repeated at each stroke of the traverser.

Having fully described my invention, what I desire to claim and secure by Letters Patent of the United States is—

1. A dog for baling presses yieldingly connected with the press, a fulcrum or pivot about which the dog may move during its excursion, and a suitably-disposed obstacle upon which the dog may also move during part of its excursion.

2. A dog for baling presses, pivoted by a slot near one end thereof, and having a backwardly-extending arm, and an inclined obstacle against which the arm is adapted to come when the dog has moved about the pivot through part of its excursion, the said plate forming with the aforesaid arm a surface upon which the dog slides during the remainder of its movement.

3. In a baling press, a dog pivoted to the side of the pressure-chamber through the slot 18, the said dog being provided with the arms 23 and 24, and a plate 19 placed at the side of the pressure-chamber behind the dog, substantially as herein described.

In testimony whereof I have hereunto set my hand and affixed my seal, this 31st day of March, 1893, in the presence of the two subscribing witnesses.

ANDREW SCHULZE. [L. S.]

Witnesses:
 WALTER D. COLES,
 A. C. FOWLER.